United States Patent [19]
Wakahara

[11] Patent Number: 5,320,202
[45] Date of Patent: Jun. 14, 1994

[54] HYDRAULIC SYSTEM FOR TORQUE CONVERTER

[75] Inventor: Tatsuo Wakahara, Kawasaki, Japan

[73] Assignee: Nissan Motor Co., Ltd., Yokohama, Japan

[21] Appl. No.: 2,454

[22] Filed: Jan. 8, 1993

[30] Foreign Application Priority Data

Jan. 8, 1992 [JP] Japan .................................. 4-001590

[51] Int. Cl.$^5$ ...................... F16D 13/72; F16H 45/02
[52] U.S. Cl. ................................. 192/3.3; 192/113.3; 60/337
[58] Field of Search .................. 192/3.3, 3.29, 113 B; 60/337

[56] References Cited

U.S. PATENT DOCUMENTS

| 4,423,803 | 1/1984 | Malloy | 192/3.29 |
| 4,966,263 | 10/1990 | Hayasaki | 192/3.3 |

FOREIGN PATENT DOCUMENTS

| 0179568 | 9/1985 | Japan | 192/3.3 |
| 0028564 | 2/1987 | Japan | 192/3.3 |
| 2-125172 | 5/1990 | Japan | |

OTHER PUBLICATIONS

Nissan Maintenance Procedure RL4F03A Manual, May, 1989.

*Primary Examiner*—Rodney H. Bonck
*Attorney, Agent, or Firm*—Foley & Lardner

[57] ABSTRACT

A hydraulic system for a torque converter is disclosed which has a converter chamber and a lock-up clutch dividing the converter chamber into a converter pressure section and a back-up pressure section. A lock-up control valve is provided, which has a first position wherein pressurized hydraulic fluid is supplied to the converter chamber and a second position wherein fluid is discharged from the back-up pressure section. A drain passage with a bimetal orifice normally closes the drain passage and is operative to open the drain passage when a temperature of the fluid in the drain passage is higher than a predetermined temperature.

4 Claims, 3 Drawing Sheets

HYDRAULIC SYSTEM FOR TORQUE CONVERTER

BACKGROUND OF THE INVENTION

The present invention relates to a hydraulic system for a torque converter with a lock-up clutch, and more particularly to a hydraulic system for preventing an increase in temperature of hydraulic fluid in the torque converter.

Japanese Patent Application First Publication No. 2-125172 discloses a hydraulic system for a torque converter with a lock-up clutch. The lock-up clutch is disposed in a converter chamber of the torque converter and movable to a lock-up position where it divides the converter chamber into a converter pressure section and a back-up pressure section. In the lock-up position, there is interrupted fluid flow between the converter pressure section and the back-up pressure section. Thus, the hydraulic fluid in the converter pressure section is subject to a temperature increase, inducing deterioration of a clutch facing of the lock-up clutch. This results in a reduced durability of the clutch facing.

An object of the present invention is to improve a hydraulic system for a torque converter with a lock-up clutch such that an excessive temperature increase in hydraulic fluid in a converter chamber is prevented with a simple arrangement.

SUMMARY OF THE INVENTION

According to the present invention, there are provided in a hydraulic system:

a torque converter having a pump impeller, a turbine runner, a stator situated between the pump impeller and the turbine runner, and a lock-up clutch, the pump impeller and the turbine runner cooperating with each other to define a converter chamber, the lock-up clutch having an engaged position wherein the turbine runner and the pump impeller are mechanically held for unitary rotation, the lock-up clutch dividing the converter chamber into a converter pressure section and a back-up pressure section when the lock-up clutch assumes the engaged position;

a lock-up control valve having a first position wherein pressurized hydraulic fluid is supplied to the converter chamber and a second position wherein fluid is discharged from the back-up pressure section;

means for defining a drain passage having one end communicating with the converter pressure section; and a bimetal orifice so constructed and arranged as to normally close the drain passage, the bimetal orifice being operative to open the drain passage when a temperature of the fluid in the drain passage is higher than a predetermined temperature.

DESCRIPTION OF THE PREFERRED EMBODIMENT

Figure 1:
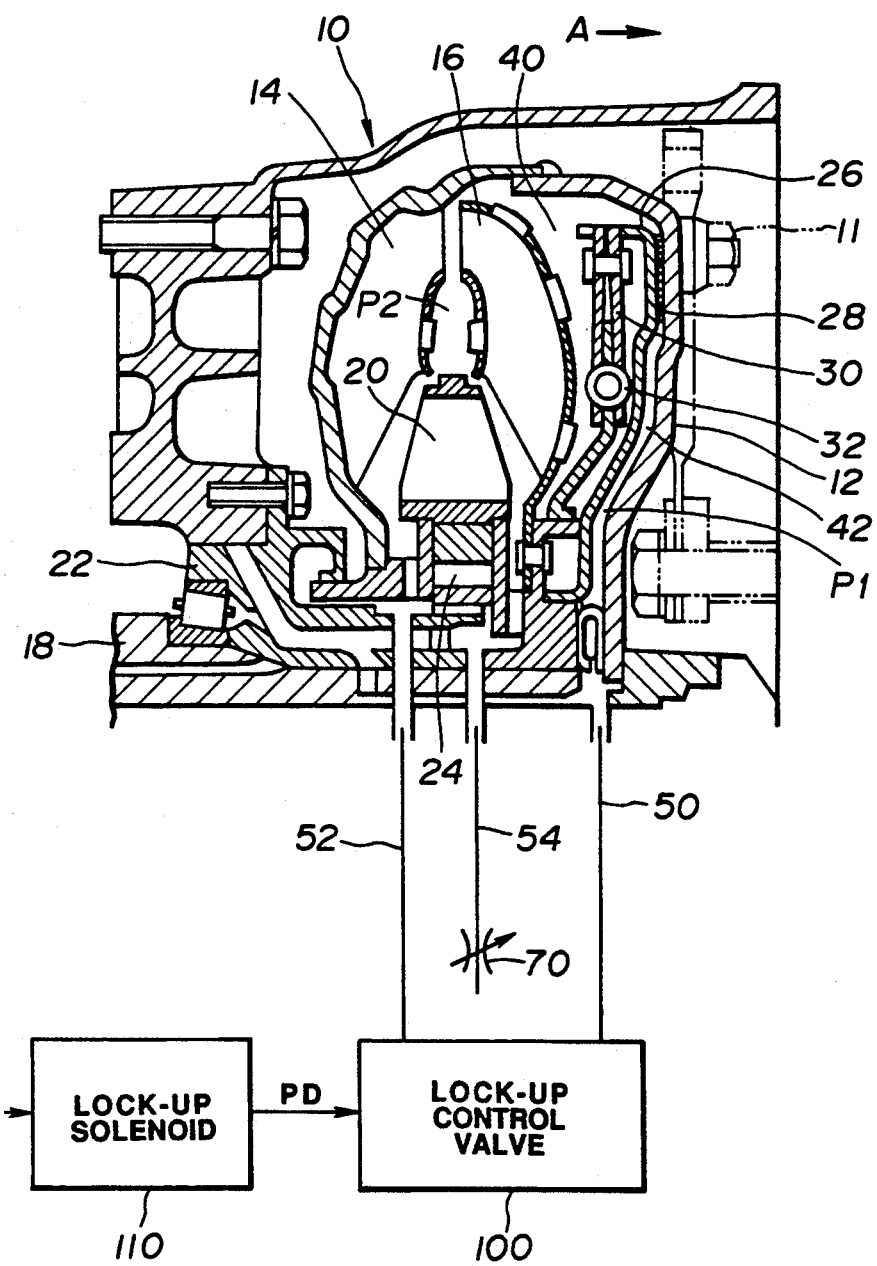
FIG. 1 is a sectional view of a torque converter and a block diagram of a hydraulic control system connected thereto, showing one preferred embodiment of a hydraulic system according to the present invention.

Referring to FIG. 1, there is shown a preferred embodiment of a hydraulic system for use in a torque converter according to the invention. Reference numeral 10 designates a torque converter which is secured to an engine housing by a fastening member 11. The torque converter 10 includes an end plate 12 to which a pump impeller 14 is secured. A turbine runner 16 is disposed between the end plate 12 and the pump impeller 14 in opposed relation to the pump impeller and secured to a turbine shaft 18 acting as an input shaft of a transmission. A stator 20 with a one-way clutch 24 is intervened between the pump impeller 14 and the turbine runner 16 and secured to a stator shaft 22. The pump impeller 14 with the end plate 12 and the turbine runner 16 cooperate with each other to define a converter chamber 40. Disposed between the end plate 12 and the turbine runner 16 is a lock-up clutch 26 including a torsional vibration damper 30 and a damper spring 32. The lock-up clutch 26 is connected to the turbine shaft 18 and movable axially with respect thereto. The lock-up clutch 26 has a friction facing 28 engageable with that formed on an inside surface of the end plate 12. The lock-up clutch 26 has an engaged position wherein the turbine runner 16 and the pump impeller 14 are mechanically held for unitary rotation. The lock-up clutch 26 divides the converter chamber 40 into a converter pressure section and a back-up pressure section 42 when the lock-up clutch 26 assumes the engaged position. Such a construction of the torque converter is disclosed in a publication entitled "NISSAN MAINTENANCE PROCEDURE RL4F03A MANUAL, MAY, 1989."

As shown in FIG. 1, hydraulic lines 50 and 52 communicate with the back-up pressure section and the converter pressure section, respectively. A drain passage 54 with a bimetal orifice 70 communicates with the converter pressure section at one end thereof. The hydraulic lines 50 and 52 are connected to a lock-up control valve 100 which is controlled by a lock-up solenoid 110. The lock-up solenoid 110 is controlled by a duty signal generated from an engine control unit ECU 120 according to measurement results by various sensors (not shown). The lock-up solenoid 110 is actuated in response to the duty signal so as to apply a duty pressure PD to the lock-up control valve 100. Owing to the application of the duty pressure PD, the lock-up control valve 100 is operated to adjust hydraulic fluid in the hydraulic lines 50 and 52 corresponding to the duty pressure PD as described in more details hereinafter.

Figure 2:
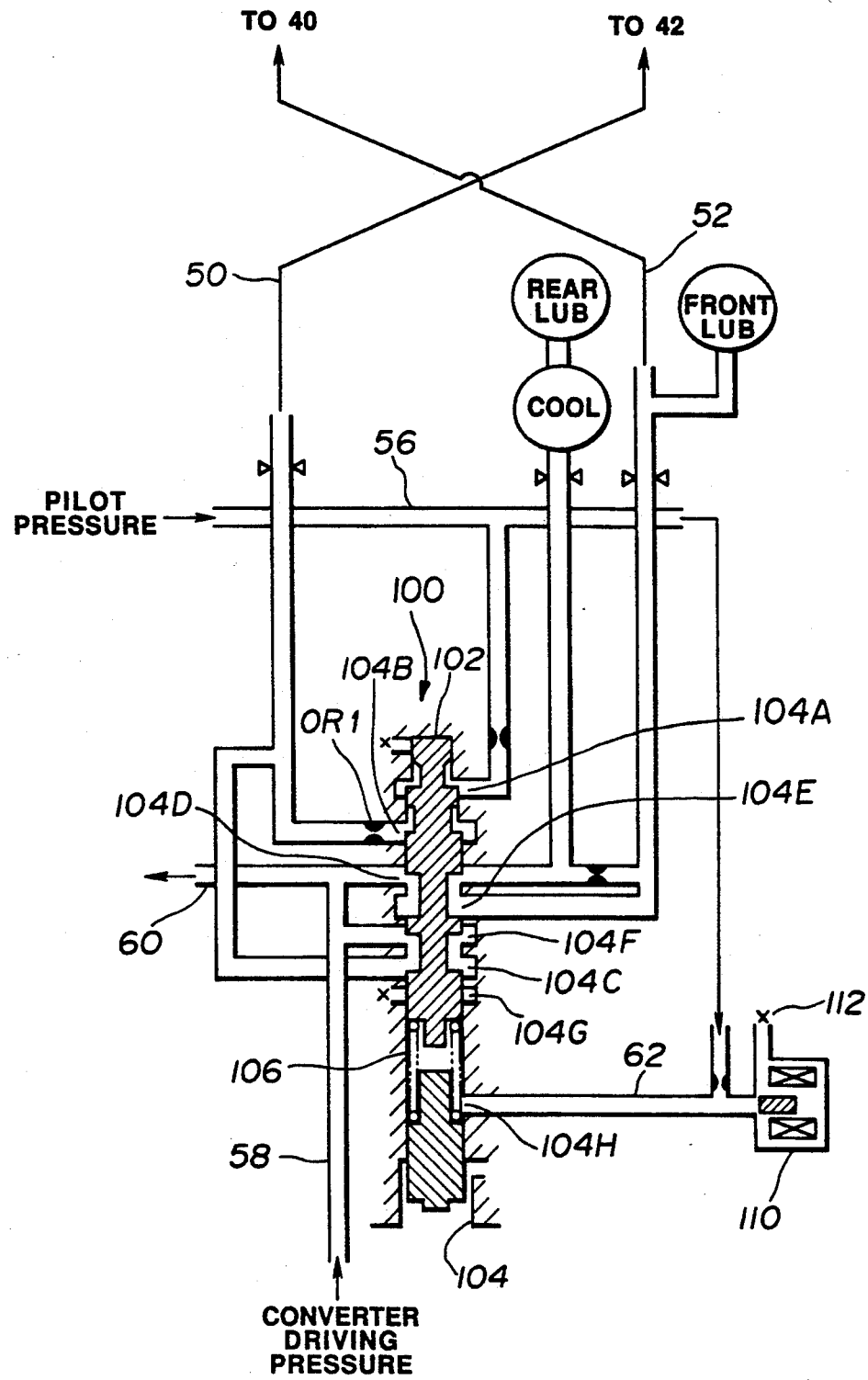
FIG. 2 is a circuit diagram of a portion of the hydraulic system of FIG. 1.

As shown in FIG. 2, the lock-up control valve 100 comprises a spool 102 slidably inserted into a valve bore 104 and a spring 106 biasing the spool 102. The valve bore 104 is provided with a plurality of ports 104A to 104H. The port 104A is connected to a hydraulic line 56 to which a pilot pressure, i.e., a constant hydraulic pressure, is supplied. The ports 104B and 104C are connected to the hydraulic line 50 connected to the back-up pressure section 42 of the converter chamber 40. The port 104D and 104E are connected to the hydraulic line 52 connected to the converter pressure section of the converter chamber 40. The port 104F is connected together with the port 104D to a hydraulic line 58 to which a converter driving hydraulic fluid is supplied for driving the torque converter 10. As a result, the hydraulic line 58 is connected to the hydraulic line 52 and a hydraulic line 60 for supply of lubricating fluid. The port 104G is a drain port. The port 104H is connected to a hydraulic line 62 connected to the lock-up solenoid 110 which has a drain port 112. A lock-up control fluid is supplied through the lock-up solenoid 110 to the hydraulic line 62.

When the lock-up solenoid 110 is operated by the ECU 120 to close the drain port 112 as seen in FIG. 2, the lock-up control fluid is allowed to be supplied via the hydraulic line 62 to apply a lock-up control pressure to the lock-up control valve 100. The spool 102 of the lock-up control valve 100 is moved upwardly as viewed in FIG. 2 to be in a first position wherein the port 104F communicates with the port 104C. The converter driving fluid supplied through the hydraulic line 58 is fed via the ports 104F and 104C to the hydraulic line 50 and via the ports 104D and 104E to the hydraulic line 52. Accordingly, the converter driving hydraulic fluid is supplied through the hydraulic line 58 and then the hydraulic lines 50 and 52 to respective right and left portions of the converter chamber 40 as viewed in FIG. 1, which are substantially separated by the lock-up clutch 26. In a case where fluid pressures as indicated at P1 and P2 in FIG. 1, which are applied to the right and left portions of the converter chamber 40, are substantially equal in level, the lock-up clutch 26 is placed in spaced relation to the end plate 12.

When the lock-up solenoid 110 is operated by the ECU 120 to open the drain port 112, a part of the lock-up control fluid is drained from the drain port 112. This drain of the lock-up control fluid causes fluid pressure in the hydraulic line 62 to be reduced. Owing to a downward bias applied by the pilot pressure to the spool 102 via the hydraulic line 56, the spool 102 is allowed to be moved downwardly as viewed in FIG. 2 to communicate the port 104C with the drain port 104G. The hydraulic fluid in the hydraulic line 50 is drained through the drain port 104G while the converter driving fluid being still supplied via the ports 104F and 104C to the hydraulic line 50. Accordingly, fluid pressure in the hydraulic line 50 is determined by a difference in amount between the converter driving fluid supplied through the ports 104F and 104C and the hydraulic fluid drained from the drain port 104G. On the other hand, since the downward movement of the spool 102 allows the port 104E to be communicated with the port 104F, the converter driving fluid in the hydraulic line 58 is still supplied through the hydraulic line 52 to the left portion of the converter chamber 40. Thus, the fluid pressure P1 in the right portion of the converter chamber 40 is reduced while the fluid pressure P2 in the left portion is maintained due to continuous introduction of the hydraulic fluid through the hydraulic line 52. Accordingly, the fluid pressure P1 is reduced to a level lower than the fluid pressure P2. Then, the lock-up clutch 26 is urged toward the end plate 12 as indicated at an arrow A in FIG. 1. Under this condition, when the lock-up clutch 26 is in a transit position wherein the lock-up clutch 26 is insufficiently engaged with the end plate 12 and a cool and fresh amount of hydraulic fluid is supplied through the hydraulic line 52 to the converter chamber 40. Owing to the supply of the hydraulic fluid, a temperature of the hydraulic fluid within the converter chamber 40 drops.

When the spool 102 is moved further downwardly to be in a second position, the hydraulic fluid drained from the drain port 104G increases so that the fluid pressure P1 is much lower than the fluid pressure P2. In this state, the lock-up clutch 26 is in the engaged position wherein the lock-up clutch 26 is completely engaged with the end plate 12 as seen in FIG. 1, the converter chamber 40 is divided into the converter pressure section and the back-up pressure section 42. Thus, the release and engagement motion of the lock-up clutch 26 is caused due to a differential between the fluid pressures P1 and P2. The fluid pressure applied via the hydraulic line 50 is proportional to the fluid pressure in the hydraulic line 62 which is controlled by the lock-up solenoid 110.

Under such a condition that the lock-up clutch 26 is in the engaged position, a temperature of the hydraulic fluid in the converter pressure section of the converter chamber 40 raises up due to heat generated by the frictional engagement of the lock-up clutch 26 with the end plate 12. Subsequently, when a temperature of hydraulic fluid in the drain passage 54 is higher than a predetermined value due to the raised temperature of the hydraulic fluid in the converter pressure section, the bimetal orifice 70 in the drain passage 54 is open to drain the heated hydraulic fluid out of the converter pressure section. The drain through the bimetal orifice 70 allows a cool and fresh amount of hydraulic fluid to be supplied via the hydraulic line 52 to the converter pressure section. The temperature of the hydraulic fluid in the converter pressure section drops due to the supply of the hydraulic fluid.

Figure 3:
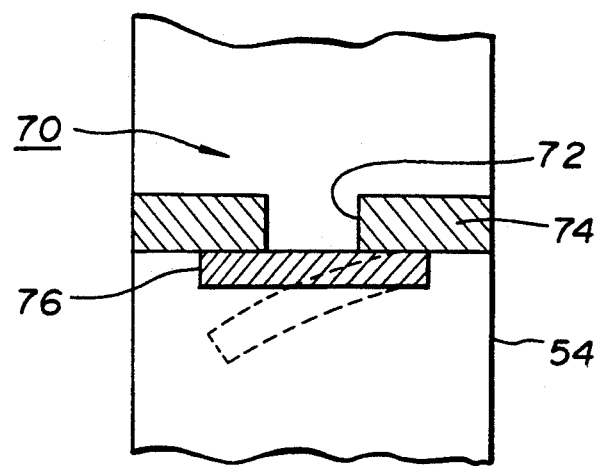
FIG. 3 is a schematic sectional view of one embodiment of a bimetal orifice for use in the hydraulic system.

FIG. 3 shows one exemplified structure of the bimetal orifice 70. The bimetal orifice 70 includes an annular ring plate 74 is secured to an inside of the drain passage 54 to define an orifice 72. The orifice 72 is normally closed by a bimetal plate 76 such that the drain passage 54 is closed. The bimetal plate 76 is so mounted on an underside of the annular ring plate 74 as to be deformable around its fixed or welded portion to open and close the orifice 72.

Figure 4:
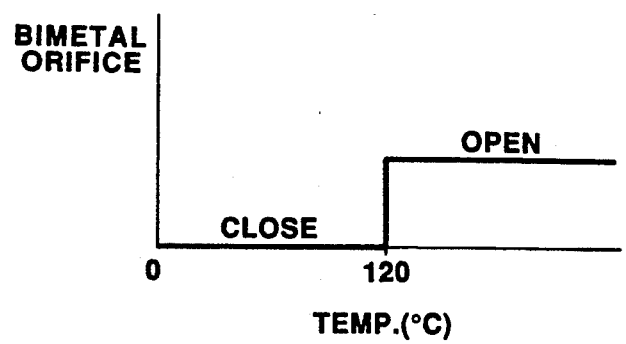
FIG. 4 is a diagram showing a thermal characteristic of the bimetal orifice.

Referring to FIG. 4, there is shown thermal characteristic of the bimetal orifice 70 serving for controlling the temperature of the hydraulic fluid in the converter pressure section of the converter chamber 40 during the engagement of the lock-up clutch 26. The bimetal orifice 70 is designed to open when a temperature of the hydraulic fluid in the drain passage 54 is higher than a predetermined value, for example 120° C. as indicated in FIG. 4. When the temperature of the hydraulic fluid in the drain passage 54 drops to less than 120° C., the bimetal orifice 70 is closed. The predetermined value is selected from a temperature range in which the clutch facing 28 of the lock-up clutch 26 does not suffer from thermal deterioration when exposed to the heated hydraulic fluid in the converter chamber 40. In addition, the bimetal orifice 70 is designed to have such an orifice area that, even when a maximum amount of the hydraulic fluid is drained through the bimetal orifice 70, the engagement of the lock-up clutch 26 with the end plate 12 is still maintained without causing its release from the end plate 12.

What is claimed is:

1. A hydraulic system comprising:
   a torque converter having a pump impeller, a turbine runner, a stator situated between said pump impeller and said turbine runner, and a lock-up clutch, said pump impeller and said turbine runner cooperating with each other to define a converter chamber, said lock-up clutch having an engaged position wherein said turbine runner and said pump impeller are mechanically held for unitary rotation, said lock-up clutch dividing said converter chamber into a converter pressure section and a back-up pressure section when said lock-up clutch assumes said engaged position;
a lock-up control valve having a first position wherein pressurized hydraulic fluid is supplied to said converter chamber and a second position wherein fluid is discharged from said back-up pressure section;
means for defining a drain passage having one end communicating with said converter pressure section; and
a bimetal orifice so constructed and arranged as to normally close said drain passage, said bimetal orifice being operative in response to a temperature of said fluid in said converter pressure section only to open said drain passage to allow drainage of hydraulic fluid from said converter pressure section bypassing said back-up pressure section when the temperature of said fluid in said converter pressure section is higher than a predetermined temperature.

2. A hydraulic system as claimed in claim 1, wherein said bimetal orifice comprises an orifice plate having an orifice, and a bimetal plate so mounted on the orifice plate as to be deformable to open and close the orifice.

3. A hydraulic system as claimed in claim 1, wherein said bimetal orifice has an orifice area such that even when a maximum amount of hydraulic fluid is drained through said bimetal orifice, an engagement of the lock-up clutch is maintained.

4. A hydraulic system as claimed in claim 1, wherein said predetermined temperature is 120° C.

* * * * *